Sept. 6, 1938.    J. E. KAHLER    2,129,217
SWATTER GUN
Filed Aug. 22, 1936    2 Sheets-Sheet 2
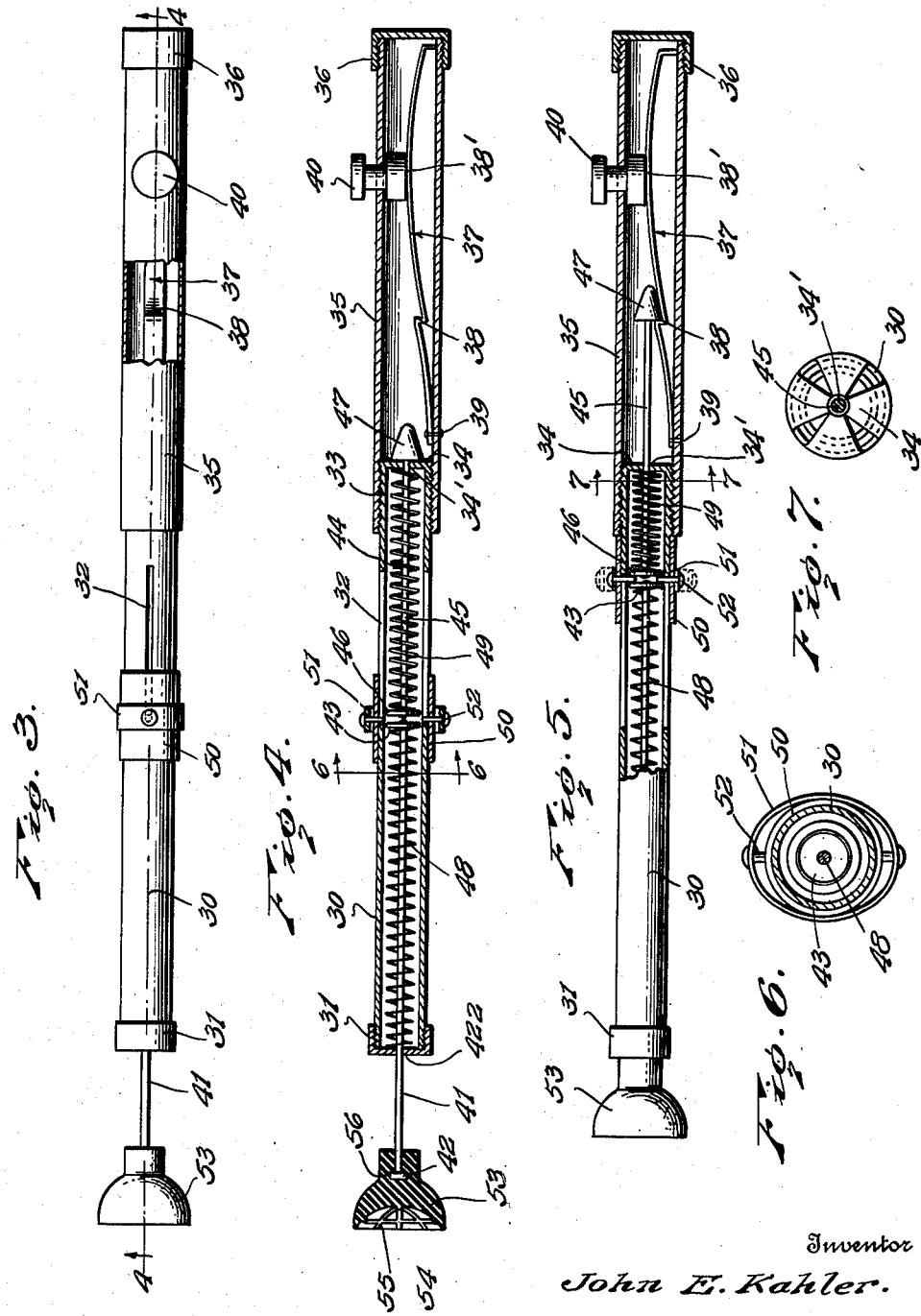
Inventor
John E. Kahler.
By Lacey & Lacey, Attorneys Patented Sept. 6, 1938

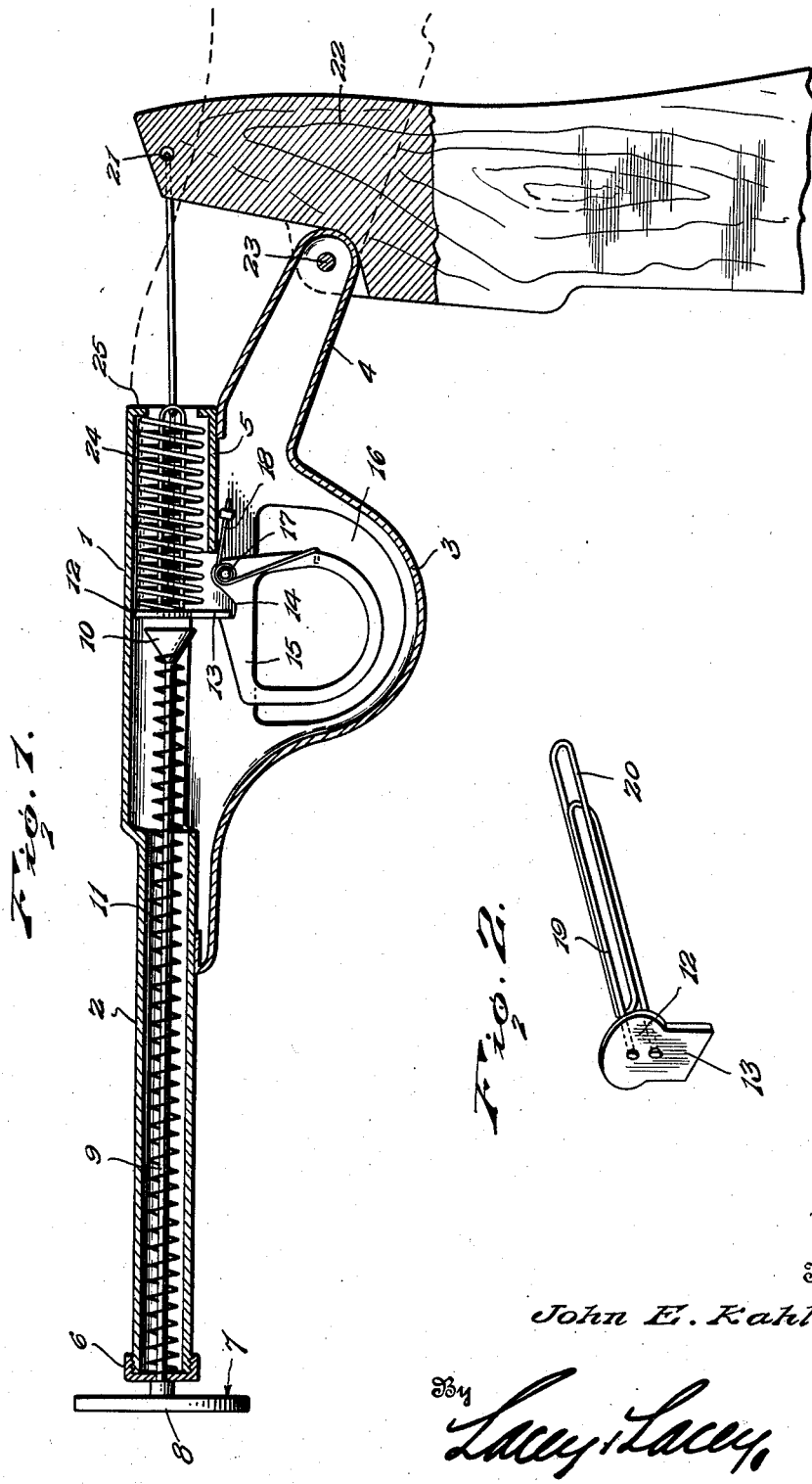

2,129,217

UNITED STATES PATENT OFFICE 2,129,217

SWATTER GUN

John E. Kahler, Kankakee, Ill.

Application August 22, 1936, Serial No. 97,467

6 Claims. (Cl. 43—135)

This invention relates to an improved swatter gun and embodies further meritorious features not disclosed in my co-pending application for Swatter gun, filed August 7, 1935, Serial No. 35,175 now Patent 2,093,659, dated September 21, 1937.

One object of the invention is to provide a swatter gun which will be compact and highly efficient in use for swatting flies and other insects at points difficult to reach with the ordinary fly swatter.

Another object of the invention is to provide a swatter gun in one embodiment of which the use of a handle will not be required, the operative parts being contained within the barrel employed with the exception of a swatter head and a portion of the stem supporting said swatter head.

A further object of the invention is to provide a swatter gun wherein the swatter head will be of such formation that crushing of insects against the surface of a wall or the like, with consequent soiling of the wall, will not take place.

And a still further object of the invention is to provide a device of this character, the swatter head of which may be readily removed for cleaning.

Other and incidental objects will become apparent as the description of the invention proceeds.

In the drawings forming a part of my application:

Figure 1 is a longitudinal sectional view of one embodiment of my invention, showing the device of this embodiment cocked and about ready for use.

Figure 2 is a detail perspective view of a portion of the cocking mechanism.

Figure 3 is a plan view, partly shown in section, of a modified form of my invention.

Figure 4 is a longitudinal sectional view on the line 4—4 of Figure 3, and showing the device after a swatting operation.

Figure 5 is a longitudinal sectional view, partly shown in elevation and showing the device cocked, ready for a swatting operation.

Figure 6 is a vertical sectional view on the line 6—6 of Figure 4, looking in the direction indicated by the arrows.

Figure 7 is a detail sectional view on the line 7—7 of Figure 5, looking in the direction indicated by the arrows.

Referring now more particularly to the accompanying drawings, wherein like numerals of reference will be seen to designate like parts throughout the several views, one embodiment of my invention is shown in Figure 1 of the drawings, and this embodiment includes a body 1 which has formed integrally therewith, a barrel 2 and a trigger guard 3. The body 1 is further provided with a stock receiving portion 4 which is formed integrally with the body and projects rearwardly therefrom. The body may be stamped, in the form of halves, from two pieces of suitable material, and connected by ears or in any other suitable manner, or, if desired, the body may be formed of a single piece of material. The body is provided with an arcuate spring guide 5 which is disposed in alinement, longitudinally of the body, with the barrel 2. The barrel is normally closed at its outer end by means of a cap 6. In order to permit the killing of flies or other small insects, I provide a swatter head 7 which may be formed of light weight relatively stiff rubber and which, in the present embodiment, will have a flat striking surface 8. The swatter head is movably connected with the body 1 by means of a stem 9 which extends longitudinally of the barrel and through the cap 6. The stem 9 is provided with an enlarged substantially frusto-conical striking head 10 which, when the stem is in retracted position, as shown in Figure 1, will extend to a point substantially centrally within the body. Surrounding the stem 9 is a relatively light spring 11 which has its outer end bearing against the inner surface of the cap 6 and its inner end bearing against the wall of the striking head 10. The spring 11 extends within the barrel 2 and serves to retain the stem and swatter head normally retracted.

In order to actuate the stem 9 and swatter head 7, I employ operating mechanism which comprises a plunger head 12, which, as best seen in Figure 2, is shaped to fit within the body and be guided thereby. The plunger head is disposed within the body at right angles to the length thereof and is adapted to strike against the striking head 10 of the stem 9 in a manner to be presently explained. The plunger head 12 is extended at its lower end, as shown at 13, and said extended portion is adapted to engage in a notch 14 in the upper end of a trigger 15 which is hingedly mounted within the body and is adapted to be manually engaged through a trigger opening 16. A pin 17 hingedly mounts the trigger in the body and a spring 18 normally urges the trigger forwardly for permitting the engagement of the portion 13 in the notch 14 when the device is cocked.

Carried by the plunger head 12 is a plunger rod 19 which is adapted to cooperate with a plunger rod 20 connected thereto in the manner of a link. The plunger rod 19 is formed by bending a strand of heavy wire upon itself and securing the free ends thereof to spaced points on the plunger head 12 while the rod 20 is formed by inter-engaging a strand of wire with the rod 19 and bending said last mentioned strand upon itself and projecting the free ends thereof through an opening 21 formed in the upper end of a stock or handle 22 which is hingedly connected with the portion 4 by means of a bolt or pin 23.

Surrounding the rods 19 and 20 and acting against the inner face of the plunger head 12 is a relatively heavy coil spring 24. The inner end of the spring 24 abuts portions 25 which are formed by turning inwardly the inner end of the body 1 and the spring guide 5.

In use, the device is cocked by rocking the stock 22 on the pin 23 so that the upper end of said stock will be shifted away from the inner end of the body 1 and the rod 20 will engage the rod 19 for retracting the plunger and engaging the portion 13 thereof in the notch 14. The plunger will be held against the tension of the spring 24. The stem 9 will be urged rearwardly within the barrel as the plunger is retracted for disposing the striking head 10 in close proximity to the plunger head 12. In retracted position, the swatter head 7 will be disposed near the cap 6. The stock 22 is then rocked to the position shown in dotted lines in Figure 1, and the device is then ready for a swatting operation. When it is desired to kill an insect with my improved swatter gun, after cocking in the manner described, it is only necessary to pull the trigger 15 for releasing the extended portion 13 from the notch 14 and thus releasing the plunger which will be suddenly urged forwardly, by the spring 24, into engagement with the head 10 so that the stem 9, with the swatter head 7 thereon, will be forced outwardly for contacting the outer face 8 of the swatter head 7 with the insect with such force that the insect will be killed. The spring 11 will offer but slight resistance to the outward movement of the stem as said spring is of relatively light construction in comparison with the spring 24. However, the spring 11 will serve to retract the stem 9 and swatter head 7 after a swatting operation and said spring will further retract the stem to lie in close proximity, as previously stated, to the plunger head 12 after the device has been cocked.

My device is characterized by the utmost simplicity and durability. It is thought that the operation of the device, as disclosed in the embodiment illustrated in Figures 1 and 2 of the drawings, will be clearly understood.

Referring now to the second embodiment of the invention, as shown in Figures 3 to 6 inclusive, the numeral 30 indicates a barrel which is closed at one end by a removable cap 31. The barrel is provided, near its opposite end, with longitudinally disposed diametrically alined slots 32 and said barrel is further provided, at said opposite end portion with threads 33 and a closed end 34. As illustrated in Figure 7, the wall 34 is formed by bending end portions of the barrel inwardly toward each other. The portions defining the wall terminate in spaced relation to each other to define an opening 34′. While I have shown the threads 33 for connecting the outer barrel with the inner barrel, it should be understood that any suitable means may be employed for connecting the barrels. Screwed on the threads 33 of the barrel 30 is an outer barrel 35 which is closed at its opposite end by a cap 36. The outer barrel is adapted to receive longitudinally therein, a trigger spring 37 which is preferably formed from a single strip of spring steel and is provided with an offset portion defining a trigger 38. The trigger spring is bowed, at 38′, and has one end secured to the inner surface of the outer barrel 35 by a stud 39. The opposite end of the trigger spring is freely shiftable longitudinally in the outer barrel. In order to actuate the trigger spring and operate the trigger, I provide a button 40.

Carried by the barrel 30 and adapted to extend longitudinally therein and through the cap 31 thereof, is a stem 41 which is provided with an enlargement 42 at its outer end. The cap 31 is provided with an axial opening 422 to receive the stem 41 slidably therethrough. The inner end of the stem 41 is provided with a striking head 43. A plunger 44 includes a rod 45, a plunger head 46 and a latch 47. Surrounding the stem 41 within the barrel 30 and between the inner surface of the cap 31 and the striking head 43, is a relatively light spring 48 while a relatively heavy spring 49 surrounds the rod 45 between the plunger head 46 and the wall 34. The spring 48 is adapted normally to retain the stem retracted while the spring 49 is adapted to deliver a striking blow against the striking head 43. In order to permit cocking of this embodiment of the invention, I provide a sleeve 50 which surrounds the barrel 30 in overlying relation to the longitudinal slots 32. The sleeve 50 is slidable longitudinally of the barrel 30. The sleeve is adapted to carry a preferably spring steel cocking or retracting member 51 which is elliptical in shape and is provided with pins 52, which pins are adapted to extend through the sleeve 50 and into the slots 32. As best seen in Figures 4 and 5, the pins are normally disposed between the striking head 43 and the plunger head 46 out of engagement with said plunger head. When it is desired to cock the device, after a swatting operation, in which position the device is shown in Figure 4, the cocking member 51 is grasped and the spring distorted into substantially circular form about the sleeve 50 for projecting the pins 52 between said striking head and said plunger head. In this position, the spring and sleeve are drawn rearwardly in the slots 32 for drawing the rod 45 and latch 47 rearwardly within the outer barrel 35, against the tension of the spring 49. The latch 47 will ride up on the trigger spring 37 and will have its forward edge engaged in the trigger 38, in cocked position. The spring 48 will, at the same time, retract the stem 41 still further within the barrel so that said stem will be properly located for striking by the plunger head 46. After the device has been cocked, pressure upon the retracting member 51 may be released, so that the pins 52 will ride out of position between the striking head 43 and the plunger head 46.

It often happens, in the use of fly swatters and other insect killing devices, that the insects are crushed against the surface upon which they are located so that soiling of the surface will take place. In order to avoid this unsightly and insanitary condition, I provide a swatter head 53 which is preferably formed of suitable weight rubber. The swatter head is provided with a concave forward swatting surface 54 which is provided with spaced ribs 55. The head is further provided, at its inner end, with a socket 56 to removably receive the enlargement 42.

In use, the device is cocked, in the manner set forth, and when it is desired to kill an insect, the button 40 is pushed downwardly for urging the bowed portion 38 of the trigger spring downwardly whereby the trigger will be shifted downwardly for releasing the latch 47 so that the plunger head 46 may be urged forwardly by the tension of the spring 49. The plunger head will thus suddenly engage the striking head 43 and will urge the stem outwardly for engaging the head 53 with the insect and effecting a killing blow. Forward motion of the plunger will be limited by contact of the inner face of the latch 47 with the end wall 34. As the head is provided with the concave striking surface 54, the insect will not be crushed against the surface upon which it was resting.

In more detail, when the slotted disc 53 is urged forwardly, the contact rim of the swatting surface 54 first engages the surface on which the insect is resting. This outer rim portion begins to spread as the central or small end of the swatter head continues forwardly under pressure of the outwardly urging force so that the ribs will be spread until the floor of the cavity is flattened against the surface carrying the insect, effecting the killing or stunning of said insect. After the initial contact of the swatter head with the surface, the swatting surface 54 will resume its normal shape and the insect will be crushed between the ribs of the surface and killed. It will be seen that the insect will not be crushed against the surface on which it was resting and that it will be removed from said surface by the swatter head and, at the same time, completely crushed between the ribs of said swatter head. For removing the crushed insect from the swatter head it is only necessary to spread back the outer rim of the enlarged end of the swatter head for spreading the ribs and freeing the killed insect therefrom.

The pins 52 will not interfere with the longitudinal movement of the plunger and stem as the retracting or cocking member 51 normally retains the pins out of the line of travel of said plunger and stem. My improved swatter gun, according to this embodiment, will be compact and will be highly efficient in use. This embodiment of the invention and the preferred form, operate in substantially a like manner as regards the stem and swatter head mechanism and it is thought that further description is unnecessary.

Having thus described the invention, what I claim is:

1. In a swatter gun, a barrel, an outer barrel associated therewith, a trigger spring in the outer barrel and having a trigger, a plunger in said first mentioned barrel, said plunger having a head, a rod and a latch, a spring surrounding the rod of the plunger, a stem carried by the barrel and movable independently with respect to said plunger, a swatter head carried by the stem, means carried on the barrel for retracting the plunger and engaging the latch with the trigger, and means for releasing the trigger and latch whereby the plunger will be urged forwardly by the tension of said spring for urging the stem and swatter head forwardly in advance of the barrel for a swatting operation.

2. In a swatter gun, a barrel having slots therein, an outer barrel connected with the first mentioned barrel, a plunger movable in the first mentioned barrel and having a latch, a spring on the plunger, means carried by the outer barrel and adapted to retain the plunger in a cocked position, a stem, a swatter head carried thereby, said stem having a portion within the barrel in close spaced relation to the plunger, and means carried on the first mentioned barrel for retracting the plunger and engaging the latch with said first mentioned means, said first mentioned means being releasable for permitting advancing of the plunger by the spring and engagement with the stem whereby forward movement of the stem and swatter head will be effected.

3. In a swatter gun, a barrel, insect swatting means carried thereby and including a stem, a retracting spring and plunger having a latch, an outer barrel, a trigger spring carried in the outer barrel and having a trigger formed thereon, and cocking means carried by the first mentioned barrel and comprising a normally elliptical retracting member having pins and being distortable for engaging the pins with the plunger whereby the plunger may be retracted for engaging the latch with the trigger in cocked position preparatory to a swatting operation, said first mentioned spring simultaneously retracting said stem for said swatting operation.

4. In a swatter gun, a barrel, swatting means carried thereby, an outer barrel connected with the first mentioned barrel, a trigger spring carried in the outer barrel and having a bowed portion, said trigger spring being offset to define a trigger latch, a button carried on the outer barrel and engageable with the bowed portion for permitting depression of the trigger spring, and means carried on the first mentioned barrel for retracting the swatting means into cocked position in engagement with the trigger, said trigger being depressible for releasing the swatting means and permitting a swatting operation.

5. In a swatter gun, a barrel having slots, swatting means carried by the barrel, a sleeve surrounding the barrel, a normally elliptical retracting member carried on the sleeve and having pins adapted to extend into the slots, said retracting member being normally distortable for disposing the pins in engagement with the swatting means whereby said swatting means may be retracted preparatory to a swatting operation, and means exteriorly of the barrel for releasing the swatting means.

6. In a swatter gun, a barrel having longitudinal diametrically disposed slots, a cap closing the barrel at one end, the other end of said barrel being threaded and being provided with a partially closed end wall, an outer barrel screwed on said threaded end of the first mentioned barrel, a stem carried in the first mentioned barrel and having a striking head, a swatter head carried by the stem exteriorly of the barrel, a plunger having a rod provided with a plunger head and a latch, a relatively light spring surrounding the stem and adapted to act against the striking head for urging the plunger rearwardly within the head, a relatively heavy spring surrounding the plunger rod, means carried by the outer barrel for controlling the movement of the plunger, a sleeve surrounding the first mentioned barrel and partially overhanging the slots, a cocking member carried by the sleeve and having pins insertable through the slots into engagement with the plunger head between the plunger head and the striking head whereby said plunger head may be retracted by drawing rearwardly the plunger rod in the slots whereby the plunger will be set in cocked engagement with the means in the outer barrel, and means carried by the outer barrel for releasing said first mentioned means and permitting forward urging of the plunger by the relatively heavy spring for overcoming the tension of the relatively light spring and shifting the stem and swatter head forwardly for a swatting operation.

JOHN E. KAHLER.